United States Patent
Malanin et al.

(10) Patent No.: US 12,060,441 B2
(45) Date of Patent: Aug. 13, 2024

(54) METHOD OF PRODUCING CELLULOSE CARBAMATE

(71) Applicant: Infinited Fiber Company Oy, Espoo (FI)

(72) Inventors: Erkki Malanin, Espoo (FI); Jani Mäkelä, Espoo (FI); Sakari Siren, Espoo (FI); Martin Stjernberg, Espoo (FI); Ali Harlin, Espoo (FI)

(73) Assignee: Infinited Fiber Company Oy, Espoo (FI)

( * ) Notice: Subject to any disclaimer, the term of this patent is extended or adjusted under 35 U.S.C. 154(b) by 0 days.

(21) Appl. No.: 18/279,078

(22) PCT Filed: Feb. 28, 2022

(86) PCT No.: PCT/FI2022/050126
§ 371 (c)(1),
(2) Date: Aug. 28, 2023

(87) PCT Pub. No.: WO2022/180309
PCT Pub. Date: Sep. 1, 2022

(65) Prior Publication Data
US 2024/0141074 A1     May 2, 2024

(30) Foreign Application Priority Data
Feb. 26, 2021  (FI) .................... 20215213

(51) Int. Cl.
*C08B 15/06*        (2006.01)
(52) U.S. Cl.
CPC .................... *C08B 15/06* (2013.01)
(58) Field of Classification Search
CPC ................................... C08B 15/06
See application file for complete search history.

(56) References Cited

U.S. PATENT DOCUMENTS

| | | | | |
|---|---|---|---|---|
| 2,134,825 A | * | 11/1938 | Hill | .......... C08B 15/06 536/30 |
| 4,404,369 A | | 9/1983 | Huttunen et al. | |
| 5,378,827 A | | 1/1995 | Keunecke et al. | |
| 5,831,076 A | | 11/1998 | Keunecke | |

FOREIGN PATENT DOCUMENTS

| | | |
|---|---|---|
| CA | 2487248 A1 | 12/2003 |
| CN | 111592603 A | 8/2020 |
| EP | 0178292 A2 | 4/1986 |
| EP | 3699201 A1 | 8/2020 |
| FI | 112795 B | 1/2004 |
| FI | 112869 B | 1/2004 |
| FI | 128164 B | 11/2019 |
| JP | S57143301 A | 9/1982 |
| JP | S58502217 A | 12/1983 |
| JP | S60210601 A | 10/1985 |
| JP | 2000505135 A | 4/2000 |
| JP | 2005525437 A | 8/2005 |
| JP | 2017521513 A | 8/2017 |

OTHER PUBLICATIONS

Google Patents machine translation of JP 2005525437 A, https://patents.google.com/, accessed online on May 17, 2024. (Year: 2024).*
Harlin: Cellulose carbamate: production and applications. VTT Technical Research Centre of Finland, Jan. 1, 2019, https://doi.org/10.32040/2019.978-951-38-8707-0.
NÄSI: Scaling of the modular synthesis of a cellulose derivative. Metropolia U of Applied Science, May 15, 2018.

* cited by examiner

Primary Examiner — Jonathan S Lau
(74) Attorney, Agent, or Firm — Laine IP Oy (57) ABSTRACT

According to an example aspect of the present invention, there is provided a method of producing cellulose carbamate in an aqueous phase. The method comprises the steps of a) providing a cellulose raw-material; b) providing urea; c) mixing cellulose and urea to provide a mixture; d) subjecting the mixture to a reduced pressure of no more than 350 mbar(a); e) heating the mixture to a temperature of 130 to 150° C. to subject cellulose to reaction with urea to form cellulose carbamate; f) releasing the pressure; and g) recovering the cellulose carbamate g) recovering the cellulose carbamate, and h) washing the cellulose carbamate with water to remove water soluble nitrogenous compounds wherein the water-soluble nitrogenous compounds make up at the most 12%, preferably 6% or less, of the total weight of cellulose carbamate and water-soluble nitrogenous compounds.

20 Claims, 4 Drawing Sheets

METHOD OF PRODUCING CELLULOSE CARBAMATE

FIELD

The present method relates to a method of producing cellulose carbamate.

BACKGROUND

Cellulose is the most widely used biopolymer in the world and it finds applications in various industries such as the paper and cardboard industry, and the textile industry as both cellulose and derivatives of cellulose, such as cellulose carbamate, cellulose acetate, ethers and esters. The dissolution of cellulose is difficult because of its semi-crystalline structure, strong hydrogen bonds in the polymer sheets and the presence of both hydrophilic and hydrophobic ends in the polymer. For this reason, cellulose requires either a modification of the structure by derivatization or an opening of the fibers and an increase in reactivity.

Several methods of derivatization are known in the art, the most well-known perhaps being the viscose process, in which cellulose is first treated with an alkali and then with carbon disulphide to produce cellulose xanthate. The viscose process is shunned more and more due to the toxic nature of carbon disulfide and the undesirable environmental impact that the viscose process has. More and more, other derivatization processes are being turned to, particularly those that are inexpensive, do not have the toxicity issues and environmental issues of the viscose process and yet still can be carried out using the available infrastructure, e.g. can be carried out in viscose wet spinning mills.

The carbamation process for the production of cellulose carbamate is one such derivatization process. Cellulose carbamate is formed by reacting cellulose with urea. Methods of producing cellulose carbamate are described e.g. in Finnish Patents Nos. 112869 and 112795 and international patent application. In one such example urea is impregnated into cellulose and a reaction between cellulose and urea is carried out in a mixture of cellulose, liquid, urea and optionally hydrogen peroxide.

In carbamation processes harmful byproducts such as biuret and ammonium carbamate are produced which have a negative effect on yield of cellulose carbamate and its purity. The byproducts contribute to uncontrolled decrease of degree of polymerization (DP) of cellulose carbamate during the carbamation process, lack of desirable solubility in aqueous alkaline solutions in the preparation of cellulose carbamate spinning dope, and thereby have a negative effect on the usefulness of the cellulose carbamate produced.

Removal of the nitrogenous byproducts and unreacted urea is described in Finnish patent number 128164. Waste streams comprising nitrogenous byproducts and unreacted urea may be led to an evaporation plant to produce dry fertilisers. Evaporation is, however an energy intensive process and in addition to the loss of urea from the carbamation reaction adds a further economical issue to be addressed. Producing dry fertilisers does not deal with the problem of one such nitrogenous byproduct, i.e. biuret, which may be poisonous to plants depending on e.g. soil conditions.

SUMMARY OF THE INVENTION

It is an aim of the present invention to overcome at least some of the problems described above and provide a method of producing cellulose carbamate. The method involves mixing cellulose and urea and reacting the formed mixture to form cellulose carbamate.

The invention is defined by the features of the independent claims. Some specific embodiments are defined in the dependent claims.

According to a first aspect of the present invention, there is provided a method of producing cellulose carbamate in an aqueous phase comprising the steps of providing a cellulose raw material, providing urea, mixing cellulose and urea to provide a mixture, subjecting the mixture to a reduced pressure of no more than 350 mbar(a), heating the mixture to a temperature of 130 to 150° C. to subject cellulose to reaction with urea to form cellulose carbamate, releasing the pressure, recovering the cellulose carbamate and washing the cellulose carbamate with water to remove water soluble nitrogenous compounds wherein the water-soluble nitrogeneous compounds make up at the most 12%, preferably 6% or less, of the total weight of cellulose carbamate and water-soluble nitrogenous compounds.

Considerable advantages are obtained by means of the invention. The present invention provides a method of producing cellulose carbamate. By means of the invention it has surprisingly been found that high-quality cellulose carbamate suitable for use in spinning dopes can be produced in high yield in an economical and reliable method under reduced pressure. It has also surprisingly been found that the formation of undesirable nitrogenous byproducts such as biuret and ammonium carbamate is minimised by means of the invention. Because the formation of undesirable byproducts is minimised, more urea can be recycled back to the process.

EMBODIMENTS

Definitions

"High consistency pulp" is one which has a solid content of cellulose of greater than 5 wt % and a liquid, typically in excess of 20 wt % and a liquid.

"Extra high consistency pulp" is a pulp that has a solid content of cellulose of greater than 20 wt % and a liquid, which does not release free water.

Cellulose means for the purpose of embodiments of the invention cellulosic materials suitable for carbamation including cellulosic sources selected from the group consisting of chemical pulp or dissolving pulp prepared from wood species such as pine, spruce, birch, beech, aspen, maple, larch, acacia, *eucalyptus*, hemlock, tupelo, and oak or non-woods such as stalk fibres (wheat straw, rice straw, barley straw, bamboo, bagasse and reed) and mixtures thereof. The origin of the feedstock can be either the virgin form of the chemical and/or dissolving pulp and/or the recycled feedstocks such as recycled paper and/or cardboard containing chemical pulp or dissolving type pulp. Additionally, cellulose includes cellulosic natural plant fibres and mixtures thereof, as such or in the form of chemical pulp and/or dissolving pulp or dissolving type pulp such as cotton waste pulp provide the source of cellulose. The origin of natural plant fibres can be their virgin forms and/or natural plant fibre containing textiles and/or recycled natural fibre containing textiles. Natural plant fibres include seed fibres such as cotton and kapok; bast fibres such as hemp, jute, kenaf, ramie, abaca and linen (flax); leaf fibres such as manilla, sisal, *ananas* and banana; fruit fibres such as coir and mixtures thereof.

The present invention relates to a method of producing cellulose carbamate. By means of embodiments it has surprisingly been found that the amount of undesirable nitrogenous byproducts in streams comprising unreacted urea is minimised, thereby alleviating or reducing the need to remove them before unreacted urea is recovered or directed to further processing. Some nitrogenous byproducts are formed in carbamation reaction regardless of selected synthesis method. Thus, byproducts or other impurities accumulate in the process.

Figure 1:
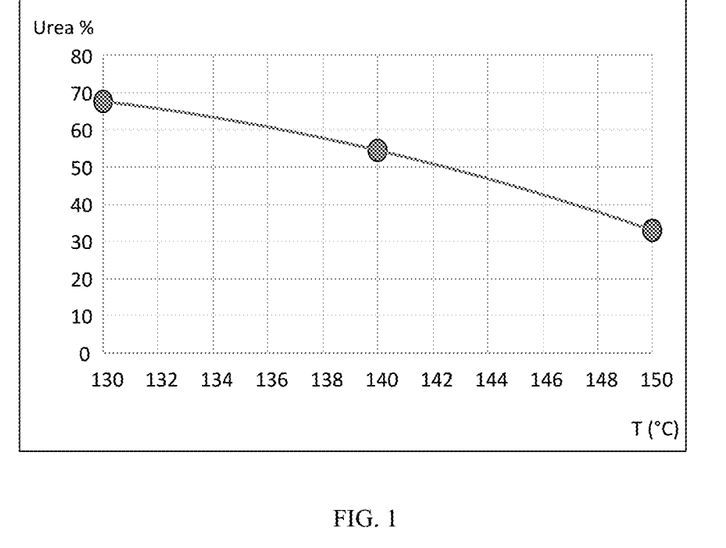
FIG. 1 is a graph plotting amount of urea as a percentage against temperature and shows the amount of urea present in an unreacted wash fraction in carbamation processes under reduced pressure of 250 mbar(a) at temperatures in the range of 130 to 150° C. in accordance with at least some embodiments of the present invention.

FIG. 1 is a graph illustrating the amount of urea calculated as a percentage present in unreacted wash in carbamation processes carried out at 250 mbar(a). The processes are carried out at 130, 140 and 150° C. As can be seen from the graph, the proportion of urea present in the unreacted wash, presented as a percentage by total weight of the unreacted wash decreases as temperature applied during the carbamation process is increased. As the fraction of urea in the unreacted wash decreases, it follows that the amount of undesirable byproducts, such as biuret and other nitrogeneous byproducts such as ammonium carbamate, in the unreacted wash increases.

Figure 2:
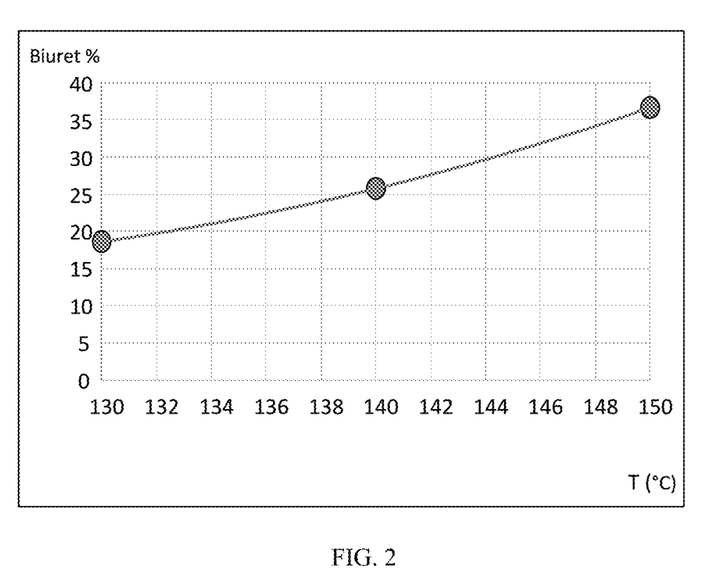
FIG. 2 is a graph plotting amount of biuret as a percentage against temperature and shows the amount of biuret present in an unreacted wash fraction in carbamation processes under reduced pressure of 250 mbar(a) at temperatures in the range of 130 to 150° C. in accordance with at least some embodiments of the present invention.

FIG. 2 is a graph illustrating the amount of biuret calculated as a percentage present in unreacted wash in carbamation processes carried out at 250 mbar(a). The processes are carried out at 130, 140 and 150° C. As can be seen from the graph, the proportion of biuret present in the unreacted wash, presented as a percentage by total weight of the unreacted wash increases as temperature during the carbamation process is increased, i.e. more undesirable biuret is produced when carbamation is carried out at higher temperatures.

Figure 3:
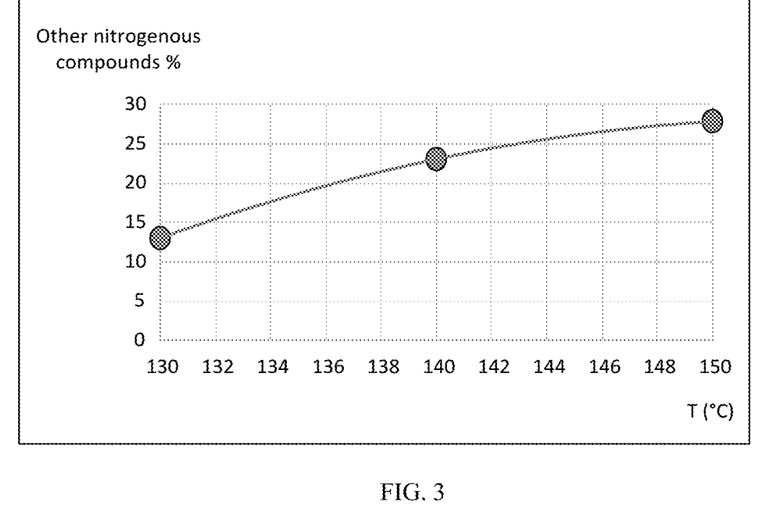
FIG. 3 is a graph plotting amount of nitrogenous compounds other than urea and biuret, such as ammonium carbamate as a percentage against temperature and shows the total amount of nitrogenous compounds other than urea and biuret, such as ammonium carbamate, present in an unreacted wash fraction in carbamation processes under reduced pressure of 250 mbar(a) at temperatures in the range of 130 to 150° C. in accordance with at least some embodiments of the present invention.

FIG. 3 is a graph illustrating the total amount of nitrogeneous compounds other than urea and biuret e.g. byproducts such as ammonium carbamate, calculated as a percentage present in unreacted wash in carbamation processes carried out at 250 mbar(a). The processes are carried out at 130, 140 and 150° C. As can be seen from the graph, the proportion of other nitrogeneous byproducts such as ammonium carbamate present in the unreacted wash, presented as a percentage by total weight of the unreacted wash increases as temperature during the carbamation process is increased, i.e. more undesirable nitrogenous byproducts such as ammonium carbamate are produced when carbamation is carried out at higher temperatures.

Figure 4:
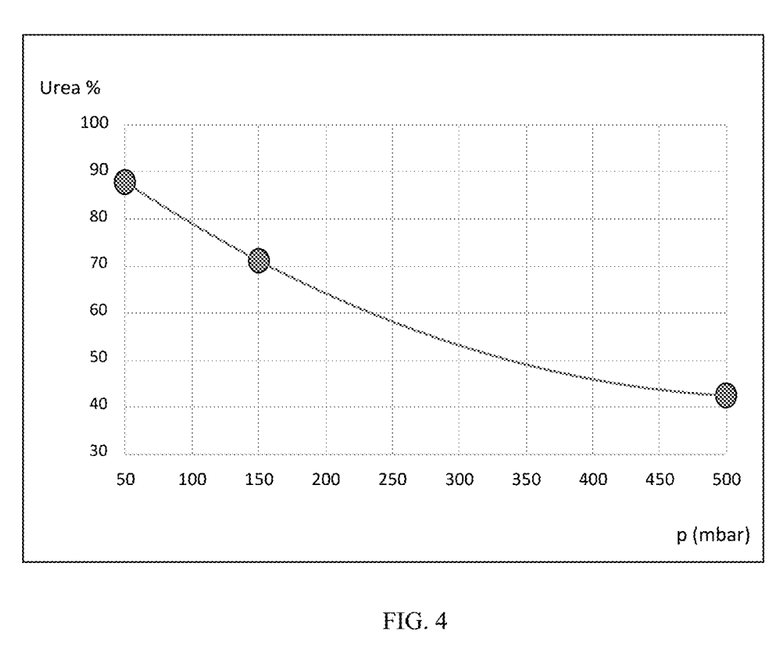
FIG. 4 is a graph plotting amount of urea as a percentage against pressure and shows the amount of urea present in an unreacted wash fraction in carbamation processes under reduced pressure between 500-50 mbar(a) in accordance with at least some embodiments of the present invention.

FIG. 4 is a graph illustrating the amount of urea calculated as a percentage present in unreacted wash in carbamation processes plotted against pressure. As can be seen from the graph, the proportion of urea present in the unreacted wash, presented as a percentage by total weight of the unreacted wash increases as pressure during the carbamation process is reduced. As the fraction of urea in the unreacted wash increases, it follows that the amount of undesirable byproducts, such as biuret and other nitrogeneous byproducts such as ammonium carbamate, in the unreacted wash decreases.

Figure 5:
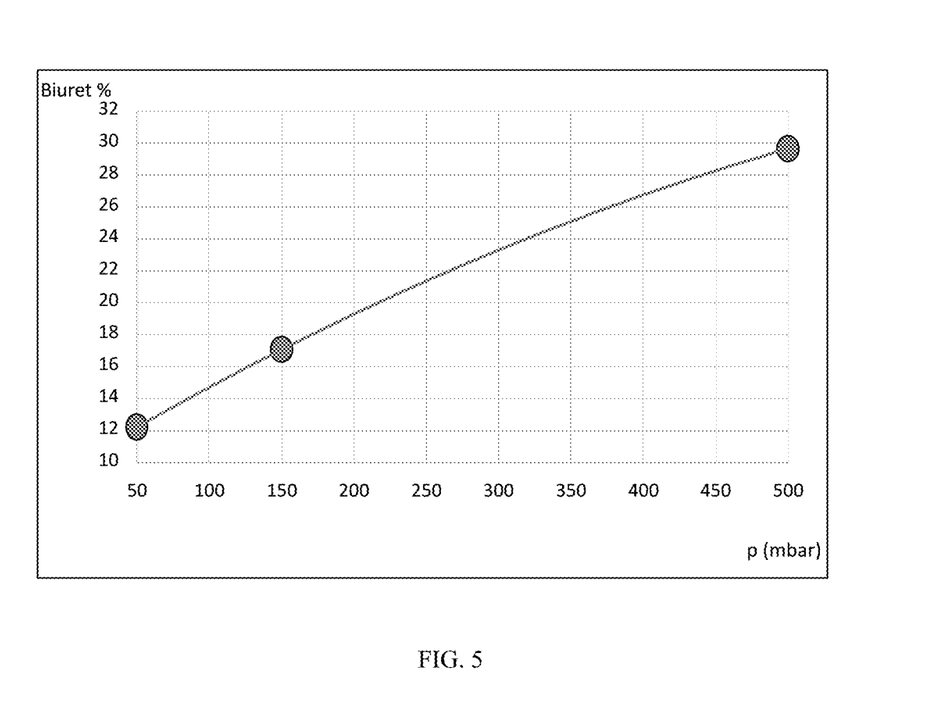
FIG. 5 is a graph plotting amount of biuret as a percentage against pressure and shows the amount of biuret present in an unreacted wash fraction in carbamation processes under reduced pressure between 500-50 mbar(a) in accordance with at least some embodiments of the present invention.

FIG. 5 is a graph illustrating the amount of biuret calculated as a percentage present in unreacted wash in carbamation processes plotted against pressure. As can be seen from the graph, the proportion of biuret present in the unreacted wash, presented as a percentage by total weight of the unreacted wash decreases as pressure during the carbamation process is reduced i.e. less undesirable biuret is produced when carbamation is carried out at lower pressures.

Figure 6:
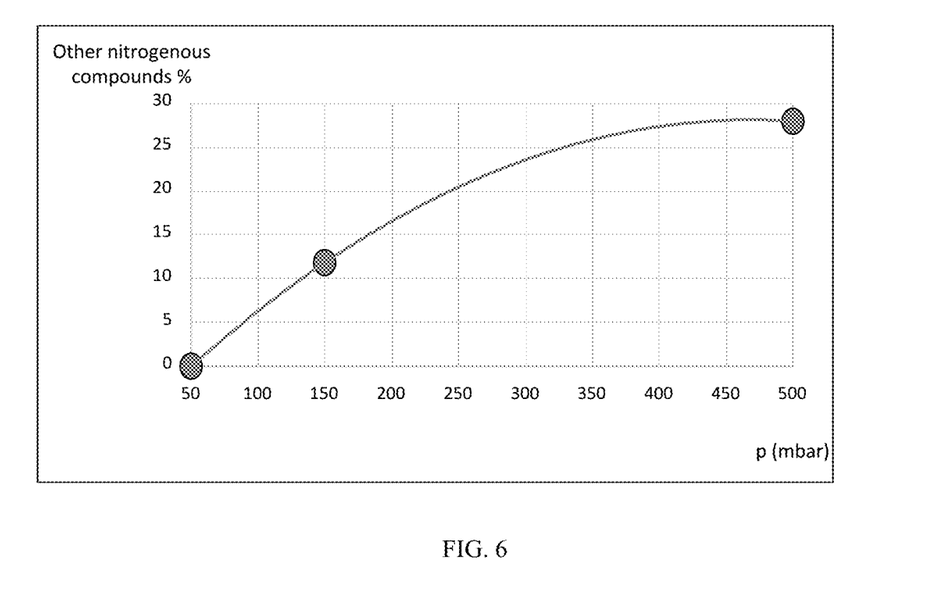
FIG. 6 is a graph plotting amount of nitrogenous compounds other than urea and biuret, such as ammonium carbamate as a percentage against pressure and shows the total amount of nitrogenous compounds other than urea and biuret, such as ammonium carbamate, present in an unreacted wash fraction in carbamation processes under reduced pressure between 500-50 mbar(a) in accordance with at least some embodiments of the present invention.

FIG. 6 is a graph illustrating the total amount of nitrogeneous compounds other than urea and biuret, e.g. byproducts such as ammonium carbamate, calculated as a percentage present in unreacted wash in carbamation processes plotted against pressure. As can be seen from the graph, the proportion of other nitrogeneous byproducts such as ammonium carbamate present in the unreacted wash, presented as a percentage by total weight of the unreacted wash decreases as pressure during the carbamation process is reduced i.e. less undesirable nitrogeneous compounds such as ammonium carbamate are produced when carbamation is carried out at lower pressures.

Figure 7:
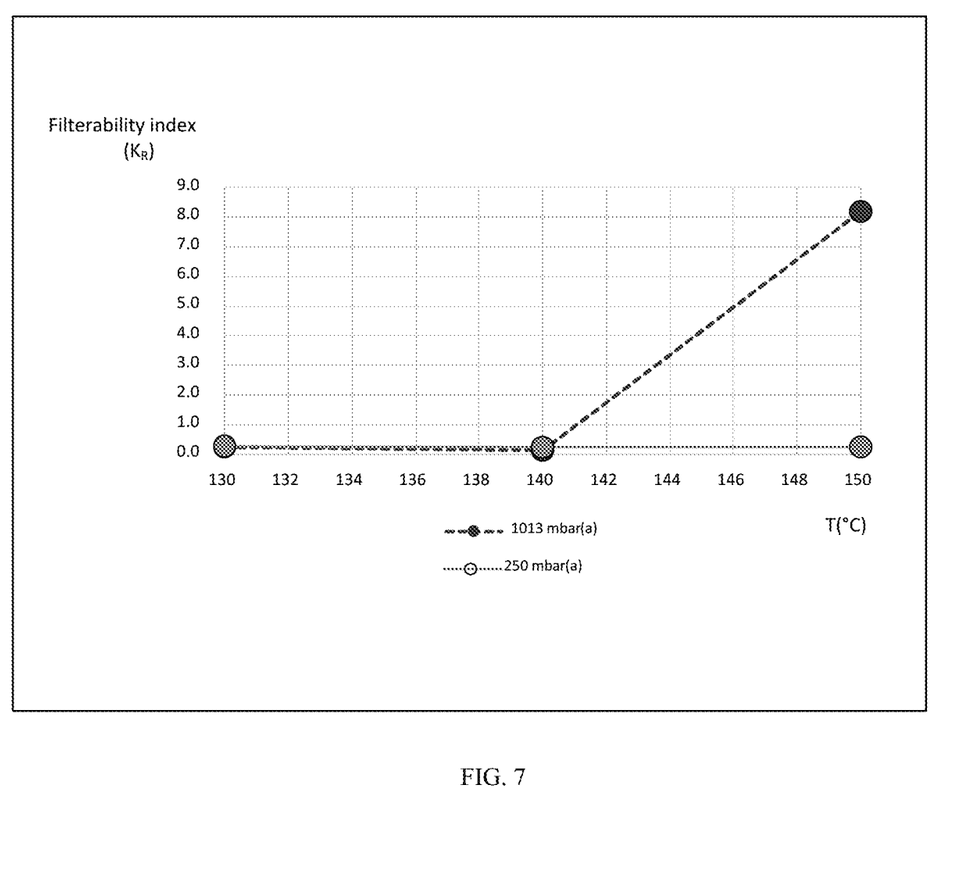
FIG. 7 is a graph plotting filterability index (KR) against carbamation temperature and illustrates the quality of dopes prepared by carbamation at normal atmospheric pressure of 1013 mbar(a) and at reduced pressure of 250 mbar(a).

FIG. 7 is a graph showing the filterability of cellulose carbamate dopes prepared at normal atmospheric pressure of 1013 mbar(a) and at reduced pressure of 250 mbar(a), at temperatures in the range of 130 to 150° C. The KR index, which corresponds to the viscosity corrected $K_w$ value indicates filterability of cellulose carbamate solutions. The lower the value, the lower is the amount of filter clogging unreactive particles having a size >10 μm found in the recovered cellulose carbamate solution. As can be seen, the filterability of the dope prepared by carbamation at reduced pressure of 250 mbar(a) remains stable at all temperatures in the range, whereas the quality of the dope produced by carbamation at normal atmospheric pressure deteriorates significantly when prepared at temperatures in excess of 140° C.

As described above, the present technology relates to a method of producing cellulose carbamate. In an embodiment, the method of producing cellulose carbamate comprises the steps of a) providing a cellulose raw-material; b) providing urea; c) mixing cellulose and urea to provide a mixture; d) subjecting the mixture to a reduced pressure of no more than 350 mbar(a); e) heating the mixture to a temperature of 130 to 150° C. to subject cellulose to reaction with urea to form cellulose carbamate; f) releasing the pressure; and g) recovering the cellulose carbamate, and h) washing the cellulose carbamate with water to remove water soluble nitrogenous compounds wherein the water-soluble nitrogeneous compounds make up at the most 12%, preferably 6% or less, of the total weight of cellulose carbamate and water-soluble nitrogenous compounds.

Cellulose carbamate is typically produced in the aqueous phase, typically by working an extra high consistency cellulose pulp or cellulose medium. Organic solvents are not used as reaction media in cellulose reaction with urea. Thus, in one embodiment urea is provided as an aqueous solution. Urea is added and contact between urea and cellulose is performed in the absence of liquid ammonia.

The range of cellulosic materials suitable for carbamation according to embodiments is diverse and in one embodiment includes cellulosic sources selected from the group consisting of chemical pulp or dissolving pulp prepared from wood species such as pine, spruce, birch, beech, aspen, maple, larch, acacia, *eucalyptus*, hemlock, tupelo, and oak or non-woods such as stalk fibres (wheat straw, rice straw, barley straw, bamboo, bagasse and reed) and mixtures thereof. The origin of the feedstock can be either the virgin form of the chemical and/or dissolving pulp and/or the recycled feedstocks such as recycled paper and/or cardboard containing chemical pulp or dissolving type pulp.

In a further embodiment natural plant fibres and mixtures thereof, as such or in the form of chemical pulp and/or dissolving pulp provide the source of cellulose. The origin of natural plant fibres can be their virgin forms and/or natural plant fibre containing textiles and/or recycled natural fibre containing textiles. Natural plant fibres include seed fibres such as cotton and kapok; bast fibres such as hemp, jute, kenaf, ramie, abaca and linen (flax); leaf fibres such as manilla, sisal, *ananas* and banana; fruit fibres such as coir and mixtures thereof.

It has been found that subjecting the mixture to a reduced pressure of no more than 350 mbar(a) results in a high-quality cellulose carbamate product recoverable from a stream that comprises unreacted urea and only minimal amounts of undesirable nitrogenous byproducts such as biuret and other nitrogenous byproducts such as ammonium carbamate. Preferably, the unreacted urea is recycled to step b) of the process, where it is optionally mixed with fresh urea before step c), thereby improving the efficiency of the process with respect to the use of urea.

In a further embodiment the mixture is heated at 130 to 140° C., in particular 135±3° C., for 60 to 240 min, preferably for 120 to 180 min, suitably for 150 min. The preferred range for heating the mixture is in the range of 130 to 135° C., which is optimal for balancing efficiency of the reaction with use of raw materials and energy.

In one embodiment the mixture of cellulose and urea is optionally flushed with an inert gas during heating at reduced pressure to form cellulose carbamate. Preferably, the inert gas is nitrogen gas. Flushing with an inert gas further reduces the amount of oxygen present in the reaction vessel or reaction zone, thereby reducing the potential for explosions in the reactor or in a plant in which the reactor is situated.

In a further embodiment the pressure is released after completion of the reaction of cellulose with urea whereby cellulose carbamate is formed. Preferably, this allows for easiest recovery of cellulose carbamate from the reactor. The completeness of the reaction between cellulose and urea whereby cellulose carbamate is formed is preferably confirmed by monitoring the amount of ammonia that is evolved or liberated. Alternatively or additionally, this can be done by measuring the reduction of total nitrogen content in samples taken directly from the carbamation reactor. The total nitrogen content is reduced while ammonia is evolved or liberated. Particularly, the degree of completeness of the reaction can be monitored and determined by measuring the amount of nitrogen bound in cellulose. The reduction in total nitrogen content in samples taken directly from the reactor or in the amount of nitrogen bound in cellulose in samples washed to be free from water soluble nitrogenous compounds can be easily determined e.g. by NIR spectroscopic measurement.

Although by means of embodiments the amount of biuret produced by the process according to the invention is reduced considerably and considerably lower amounts of other nitrogenous byproducts, such as ammonium carbamate are produced, the cellulose carbamate obtained by the reaction of cellulose and urea is, in an embodiment, preferably washed with water to remove water-soluble nitrogenous compounds and non-urea compounds and optionally other water-soluble compounds from the cellulose carbamate. In one embodiment the water-soluble nitrogenous compound removed by washing are e.g. urea, biuret, ammonium carbamate and degradation products of cellulose polymer reacted in carbamation reaction in the presence of urea. In the further embodiment the other water-soluble compounds comprising organics e.g. degradation product of cellulose polymer and inorganics e.g. mono-, di- and polyvalent cations and anions e.g. chlorides, sulphates and carbonates. In a preferred embodiment water-soluble non-gaseous nitrogenous compounds and non-urea compounds, and optionally other water soluble compound, preferably water soluble organics and water soluble inorganics are recovered separately from the cellulose carbamate and recovered in the form of an aqueous solution. In a particular embodiment non-urea compounds, preferably the majority of non-urea compounds are separated from aqueous solution, preferably allowing the recycling of urea in the aqueous solution to step b) of embodiments of the process. In a further embodiment the recovered aqueous solution is optionally concentrated by evaporation.

Various methods of separating non-urea compounds from the aqueous solution are suitable to embodiments of the present technology. In a preferred embodiment the separation of non-urea compounds is performed by selecting separation methods from the group consisting of ion exchange, membrane filtration, electrodialysis and crystallization. In further embodiment crystallization follows by centrifugation or filteration. Membrane filtration includes e.g. nanofiltration and reverse osmosis.

As described above, the amount of biuret produced is preferably reduced by means of embodiments. Similarly, the amount of other nitrogenous byproducts is preferably, reduced, particularly the amount of other nitrogenous byproducts is minimised in some embodiments. In one embodiment, after reaction step f), solid water-soluble nitrogeneous compounds make up at the most 12%, preferably 6% or less, of the total weight of cellulose carbamate and water-soluble nitrogeneous compounds. Gaseous ammonia released in the reaction is evaporated leaving only solid water soluble nitrogenous compounds in the mixture. In embodiments nitrogenous compounds means unreacted urea and non-urea compounds like biuret and other nitrogenous compounds.

Water soluble substances such as divalent and polyvalent metal ions recovered from cellulose carbamate will accumulate in the process if not removed prior to recycling the urea to step b. In an embodiment wash filtrate, which contains urea and non-urea compounds in soluble form is recovered and preferably eluted through an ion-exchange resin packed e.g. in a suitable column, preferably containing a cation exchange resin type, more suitably a strong acid cation exchange resin type, most suitably containing Amberlite SR1L NA. In a preferred embodiment the filtrate is eluted through a cation exchange resin to remove divalent and or polyvalent cations, preferably calcium and optionally magnesium ions from the filtrate, thereby providing an eluate. The amount of divalent and polyvalent cations in the eluate is negligible. In one embodiment the wash filtrate feed was eluted at rate varied suitably between 2-75 dm3/kg/h and preferably 5-25 dm3/kg/h per kg of the selected cation exchange resin type. Cation exchange treatment can be done in the presence of monovalent cations such as sodium ions in wash filtrate feed. In one embodiment the wash filtrate contains sodium ions up to 3000 mg/dm3, more suitable up to 600 mg/dm3. In further embodiment the feed temperature is between 5 and 80 degrees Celsius, preferably between 25 and 45 degrees Celsius.

In addition to the water-soluble substances such as divalent and polyvalent metal ions recovered from cellulose carbamate, also monovalent ions, such as sodium ions, water-soluble anions such as chlorides, sulphates and carbonates and water-soluble organic degradation products of cellulose polymer can be present in the recovered wash filtrate and they will accumulate in the process if not removed prior to recycling the urea to step b. In one embodiment the eluate obtained from ion exchange treatment is preferably treated by membrane filtration, suitable to separate monovalent ions, anions, dissolved degradation products of cellulose polymer and preferably most of the other nitrogenous compounds such as sodium and ammonium carbamates and degradation products of cellulose polymer reacted in carbamation reaction in the presence of urea from urea and biuret. In a particular embodiment, membrane filtration is carried out using the spiral wound ion selective type of membrane, suitably with membrane pore size of <1000 Da, preferably 100-400 Da. In one embodiment the feed pressure is between 1.0 and 80 bar(g), more suitably between 5 and 45 bar (g) and preferably between 4.0 and 20 bar(g). 4 and 20 bar(g). In further embodiment the feed temperature is between 10 and 70 degrees Celsius and suitably between 25 and 45 degrees Celsius. In an embodiment at least a part of the ion exchange treated solution is collected as a permeate, suitably >60% and preferably >80% of the ion exchange treated solution, or volume fraction of the ion exchange treated solution, is collected as a permeate and a second part of the ion exchange treated solution, or the remaining volume fraction, suitably <40% and preferably <20% is collected as a concentrate. In one embodiment the concentrate is diafiltrated, e.g. diluted with water and further concentrated, to increase recovery yield of urea and biuret. In further embodiment the diafiltrated permeate is mixed with the permeate, or alternatively mixed with the ion exchange treated eluate feed. Colour of the eluate feed and colour of the recovered permeate indicates the presence of soluble degradation products of cellulose polymer and degradation products of cellulose polymer reacted in carbamation reaction in the presence of urea. It was found, that the permeate recovered from membrane filtration is typically visually colourless. Alternatively, colour can be measured spectrophotometrically at 430 nm.

In further embodiment desalination of ion exchange treated eluate is performed by electrodialysis. The amount of inorganic salts in eluate is mitigated by electrodialysis treatment.

In a further embodiment, the permeate obtained from the membrane filtration step is concentrated, preferably from a total dissolved solids content of about 0.1% by weight up to a total dissolved solids content of about 70% by weight by evaporation.

Further embodiments relate to the removal of biuret from the evaporated concentrate, particularly by biuret crystallization. In one embodiment the evaporated concentrate is subsequently suitably cooled to 5-50 degrees Celsius and preferably to 15-30 degrees Celsius, preferably with continuously stirring, thereby obtaining a precipitate.

In an embodiment, the obtained precipitate is filtered or centrifuged out from the mother liquor. In a preferred embodiment the unwashed precipitate contains 60 to 95% by weight of biuret, typically 75% or more by weight of biuret (analytical method: biuret forms complex with potassium sodium tartrate and $Cu^{2+}$ ions, which is quantitatively measured by spectrophotometer at 546 nm according to method published in the Regulation (EC) No 2003/2003 or alternatively by HPLC method). The majority of the biuret is found in the biuret rich precipitate. In one embodiment 80 to 95%, particularly 90% or more of the total amount of biuret is in the biuret-rich precipitate. In a further embodiment 5 to 20%, suitably 10% or less of the total amount of biuret was found in the mother liquor. The urea:biuret ratio in the mother liquor is preferably better than 25:1, suitably better than 30:1. In the further embodiment the filtered or centrifuged biuret-rich precipitate can be suitably washed to further increase the biuret content and decrease the urea content of the recovered precipitate. Washing of the precipitate can be suitably done in the centrifuge or in the filter device. Washing waters can be recycled to evaporation.

In a particularly preferred embodiment urea is recovered and preferably recycled to the urea providing step b where it is preferably combined with any fresh feed of urea. This recycling of urea has a significant reduction on use of raw materials and thereby reduces the burden on the environment, particularly reducing the amount of nitrogen entering wastewater systems.

Further embodiments relate to the extraction of ammonia from the reactor. In an embodiment ammonia released during the reaction between cellulose and urea is separately, and preferably continuously withdrawn. In a preferred embodiment the ammonia is recovered from the reactor by a vacuum pump and by subsequent absorption in water and optionally directly reacted with acid to form an ammonium salt of the used acid e.g. with sulphuric acid to form ammonium sulphate. In a further embodiment the ammonia recovery is enhanced by injecting an inert gas stream, e.g. a nitrogen stream, to the reactor. The ammonia solution in water typically has a concentration of up to about 33% by weight ammonia solution, preferably 25% by weight ammonia solution. Gaseous ammonia can optionally be directed to other integrated processes or condensed to a liquid ammonia. Salts of ammonia and acid e.g. ammonium sulphate are typically recovered as saturated solutions in water or further crystallized to hydrated or dehydrated salts in solid form.

As described above the pressure to which the mixture is preferably no more than 350 mbar(a). In one embodiment the mixture is subjected to a pressure of no more than 300 mbar(a), in particular to a pressure of 10 mbar(a) up to less than 250 mbar(a), for example to 50 to 200 mbar(a). In a preferred embodiment the mixture obtained at step c) is subjected to reduced pressure at step d) without an intermediate step of removing water from the mixture. Preferably eliminating an intermediate step of removing water from the mixture reduces the complexity of the process. Use of reduced pressure contributes removal of residual free water from the mixture of cellulose and urea during the initial phase of carbamation reaction.

As described above in an embodiment after the carbamation reaction, the pressure is released. In a particular embodiment the pressure is released at step f) to become ambient.

In embodiments the cellulose and urea are subjected to mechanical working while forming the mixture of cellulose and urea. Mechanical working preferably alters accessibility of cellulosic fibres to urea thereby improving e.g. the yield of the carbamation reaction, particularly increasing the homogeneity of the cellulose carbamate recovered from carbamation reaction. In a further embodiment the mechanical working comprises the step of shear mixing in a mechanical mixing device, in particular a continuous mechanical mixing device. Various mixing devices may be employed in embodiments of the invention. In an embodiment the mechanical mixing device is selected from the group consisting of knife mill, hammer mill, ball mill, disc type mill, pellet press and extruders. In a preferred embodiment the mechanical device is a pellet press, e.g. a Kahl press. Other pellet presses suitable for the mechanical mixing of cellulose-based materials as described herein, are equally suitable for use in embodiments of the present invention.

In a further embodiment the mixture is mixed continuously during steps d) and e) until the carbamation reaction is completed. Suitably, the continuous mixing drives the carbamation reaction to completion. Optimized continuous mixing contributes to drive liberated ammonia out from the cellulose-urea mixture during the carbamation reaction. Continuous mixing simultaneously contributes to preventing prolonged contact between the hot surfaces of the reactor and cellulose urea-mixture during the carbamation reaction. Even if any contact of cellulose-urea mixture occurs in the reactor, the reduced pressure used balances the rate of chemical reactions between cellulose and urea and also the rate of byproducts forming in side-reactions.

In an embodiment the mixture of cellulose and urea in the aqueous phase comprises an initial solid content in water of at least 25 wt % by weight of the composition, preferably at least 50 wt % by weight of the composition, suitably at least 65 wt % by weight of the composition, particularly up to 75% by weight of the mixture, most preferably 71% or 72% or 73% or 74% by weight of the mixture. Mechanical working of extra high consistency cellulose media or cellulose pulps, such as these as compared to low consistency cellulose media or cellulose pulps provides improved dislocation of lamella in fibre cell walls leading to improved absorption of chemicals such as urea on a molecular level in the mixture, or pulp. The initial solid content of at least 25 wt % by weight of the mixture ensures efficient handling of the cellulose, i.e. that the cellulose walls are acted on by sufficient shear forces to effectively break down cell walls and increase accessibility of the cellulose fibrils of solvents and chemicals. Best handling of the cellulose occurs when the initial solids content is at least 50% by weight of the mixture, preferably the initial solid content is 50% or more by weight of the mixture, for example, more than 50% by weight of the mixture, such as 51% by weight of the mixture, 52% by weight of the mixture or for example, 55% by weight of the mixture, suitably at least 65% by weight of the mixture, particularly up to 75% by weight of the mixture, most preferably 71% or 72% or 73% or 74% by weight of the mixture.

In one embodiment, the mixture formed of the cellulose raw material and urea has a dry matter content greater than 50% by weight, in particular greater than 60% by weight, typically about 65 to 95% by weight.

The cellulose raw material can be provided at a desired moisture level—or when provided as an aqueous slurry, at a desired consistency. After the optional pretreatment, the consistency of the cellulose raw material, when provided as an aqueous slurry, can be increased by dewatering or drying. The dewatering or drying step can be carried out before mixing with urea or, preferably after.

An alkaline pH may be beneficial in fibrillating cellulose or enhancing its reactivity with urea regardless the source of the feedstock. In an embodiment some alkali is required to be mixed with cellulose media typically before it is dewatered to feed into the step c. Alternatively alkali can be added during dewatering step or after dewatering e.g. by aspiration of alkaline solution into cellulose media before feeding the mixture into the step c. In one embodiment, the pH of alkalized cellulose media is 10.0 or higher, preferably the pH is 10.5 or higher, optionally the pH is in the range of 7.0 to 14.0. pH of the alkalized cellulose media corresponds to pH of liquid measured by standing or extracting 10 g of alkalized and dewatered cellulose media in 100 g of water and measuring the pH of the obtained water extract or water solution. In order to achieve the preferred pH of the liquid, typically 1-15 g of alkali is added per kg of dry cellulose. Alkali can be selected from the group consisting of alkaline metal hydroxides or carbonates or combinations thereof. Preferably the alkali is sodium hydroxide. In case of the integrated units for preparation of cellulose feedstock and carbamation of the said feedstock, pH of cellulose media can be adjusted to the preferred level for carbamation process already in latest process stages of feedstock preparation.

In an another embodiment the cellulose media is dewatered and mechanically treated without adding an alkali.

In one embodiment the cellulose feedstock in step a has a degree of polymerization (DP) of DP 250 to 800, preferably DP 270 to 400. The degree of polymerization value of DP 250 corresponds to an intrinsic viscosity of 197 ml/g according to ISO 5351. Further, for natural fiber derived cellulose feedstock such as cotton derived feedstock or for chemical or dissolving pulp feedstock or dissolving type pulp feedstock, an adjustment of DP, if it is higher than the preferred range of DP 270 to 400, can be carried out using, in one embodiment, hydrogen peroxide or other peroxo compounds. For cellulosic feedstock, an adjustment of DP is carried out using, in one embodiment, hydrogen peroxide or other peroxo compounds. In another embodiment, adjustment of DP is carried out using an acid, such as mineral or organic acid, or combination of acids. Sulphuric acid can be employed as an acid for adjusting the DP. It is beneficial for the optimum molecular weight distribution of the feedstock, that DP adjustment by acidic treatment is included either in preparation of cellulose feedstock or feedstock is treated with acid prior to mixing the cellulose with urea in step c. Hydrogen peroxide is typically and optionally added in step c.

In step c, 11-22 percent urea is preferably added by weight of dry cellulose pulp.

In one embodiment the cellulose carbamate recovered in step g, washed and dried has a degree of polymerization (DP) of DP 200 to DP 400, in particular about DP 250 or higher. The degree of polymerization value of DP 250 corresponds to an intrinsic viscosity of 197 ml/g.

In one embodiment the cellulose carbamate recovered in step g, washed and dried has a degree of substitution (DS) of 0.1 to 0.3, in particular about 0.25 or less. After dissolution the DS of the cellulose carbamate diminishes slightly. The degree of substitution of the cellulose carbamate is determined by the total nitrogen content determination according to SFS 5505:1988. The degree of substitution value of 0.24 corresponds to total nitrogen content of 2.0% per absolute dry water insoluble fraction of the cellulose carbamate.

In one embodiment the cellulose carbamate recovered in step g, washed and dried has a content of water insolubles, typically at least 99.0%, suitably at least 99.2%, preferably at least 99.5% determined by gravimetry by extracting of known amount of cellulose carbamate with known amount of hot water and determining the dissolved solid content in the water extract after filtration, amount of water insoluble substances (%)=100%−water solubles (%).

In one embodiment the cellulose carbamate recovered in step g, washed and optionally dried can be used as raw material for manufacturing of textile staple fibres or filaments, non-woven fibres, films, sponges and casings.

Next, embodiments will be illustrated by means of the following examples.

EXAMPLES

Example 1: Batch Carbamation Under Reduced Pressure in Mixing Reactor

Cellulose pulp raw material suitable for use in cellulose carbamate manufacturing having a degree of polymerization (DP) of 413 (determined as a CED viscosity according to modified ISO 5351) was prepared from recycled cotton textile waste. The pulp preparation process was carried out as described in Finnish patent application No. FI20205250.

Cellulose carbamate was made in a Lödige type mixing reactor. The pulp prepared from the recycled cotton textile waste was dewatered in the presence of sodium hydroxide at a dosage of 6 g/kg of air dry cellulose material under vacuum conditions to about 85% by weight dry matter content of the mixture. A pH value of the liquid in alkali treated material was determined by standing 10 g of dewatered material in 100 g of water, the measured pH value of the water solution was 10.5. Hydrogen peroxide (0.24% $H_2O_2$ by weight of dry cellulose pulp) was mixed with an aqueous solution of urea (18.5% urea by weight of dry cellulose pulp) and the mixture was added to the pulp. After addition of the aqueous solution of urea and hydrogen peroxide, the obtained dry matter content of the cellulose-urea-sodium hydroxide mixture was 72±2% by weight of the mixture, which facilitated flexible mechanical treatment. The mechanical pretreatment was done six times (6) sequentially by shear mixing in a pellet press type continuous mechanical mixing device.

The mechanically pretreated mixture of pulp, urea, hydrogen peroxide and water was put back into the mixing reactor. The mixture was subjected to reduced pressure of 350 mbar(a) and continuously mixed and simultaneously flushed with nitrogen gas at reduced pressure and elevated temperature to form a cellulose carbamate. Calculation of the carbamation reaction time was started when the temperature reached 133° C. and the temperature was increased up to about 135 degrees Celsius for the actual carbamation reaction. Total reaction time was 180 min after reaching the target initial temperature of 133 degrees Celsius. Ammonia gas released during the carbamation reaction was scrubbed in water and recovered as ammonia water (as ammonium hydroxide solution).

After carbamation the mixture in a pellet form obtained by the pellet press device, the cellulose carbamate pellets were ground. The ground cellulose carbamate in powder form was washed with water to remove soluble nitrogenous compounds. The washing procedure was performed by slurring ground cellulose carbamate in water at 50 degrees Celsius, the slurry contained about 10% by weight of cellulose carbamate. The cellulose carbamate slurry was pumped into the filter press device for pressing out the filtrate containing most of the water soluble nitrogenous compounds and non-urea compounds. The filtrate was recovered for recycling the unreacted urea and separation of most of the reaction byproducts.

The washed cellulose carbamate was recovered at dry matter content of about 54% by weight and subsequently dried at temperature below 130 degrees Celsius. The degree of polymerization of cellulose carbamate was DP 268 (determined as a CED viscosity according to ISO 5351), the degree of substitution was 0.19 (determined as a total nitrogen content according to SFS 5505:1988) and the content of water insoluble substances was 99.2% (determined by gravimetry by extracting of known amount of cellulose carbamate with known amount of hot water and determining the dissolved solid content in the water extract after filtration, amount of water insoluble substances (%)=100%−water solubles (%)) and measured in the washed and dried cellulose carbamate sample.

Dissolving of cellulose carbamate was carried out as described in Finnish patent application No. FI20206386.

For cellulose carbamate fibre wet spinning the obtained cellulose carbamate solution was subsequently filtered using the two-stage backflush filtering process using the 15 μm filter media in the second filtration stage. Wet spinning of filtered and deaerated cellulose carbamate dope was carried out using the spin bath optimized for cellulose carbamate process containing e.g. sodium sulphate and free sulphuric acid. The applied godet stretching stress at fibre sampling was 73-80% under hot bath stretching conditions. The obtained filament titre was 1.3 dtex. Fibre tenacity at break measured from the filament samples was >22 cN/tex (SFS-EN ISO 5079).

Example 2: Recycling Unreacted Urea, Separation of Organic Carbamation Reaction Byproducts and Inorganic Salts from Cellulose Carbamate Wash Filtrate 1 $m^3$ of wash filtrate, corresponding 250 kg of cellulose carbamate recovered from carbamation reaction and suspended in 2.5 $m^3$ of demineralized water, was obtained from the filter press as explained in example 1. For ion exchange treatment the filtrate was eluted through the ion exchange column filled with 36 kg of cation exchange resin type of Amberlite SR1L NA at the rate of about 500 dm3/h to remove calcium and magnesium ions from the filtrate.

| Example of test results based on the ion exchange treatment | | | |
|---|---|---|---|
| | | Feed | Eluate |
| Calcium (SFS-EN ISO 17294-2; EN ISO17294-1) | μg/l | 1700 | <100 |
| Magnesium (SFS-EN ISO 17294-2; EN ISO17294-1) | μg/l | 170 | <40 |
| Sodium (SFS-EN ISO 11885: 2009) | mg/l | 197 | 197 |
| Colour (absorbance by spectrophotometry at 430 nm) | | 0.787 | 0.787 |

The eluate obtained from ion exchange treatment was subsequently treated by membrane filtration to separate monovalent ions and most of the other nitrogeneous compounds such as sodium and ammonium carbamates from urea and biuret. The membrane filtration was carried out using the ion selective type membrane with porosity of 200 Da by circulating the solution through the membrane and back to the feed container as a concentrate. The feed rate varied between 440 and 700 dm3/h and feed pressure between 12.0 and 13.7 bar(g). 87% of the ion exchange treated solution was collected as a permeate and the remaining 13% as a concentrate.

| Example of test results based on the membrane filtration | | | |
|---|---|---|---|
| | | Permeate | Concentrate |
| Volume fraction (permeate/concentrate ratio) | % | 87 | 13 |
| Conductivity | µS/cm | 60 | 5100 |
| Urea (by HPLC analysis) | mg/l | 3300 | 4800 |
| Biuret (by HPLC analysis or Regulation (EC) No 2003/2003) | mg/l | 1100 | 5800 |
| Total nitrogen as N (by SFS 5505: 1988) | mg/l | 1800 | 6700 |
| Ammonium nitrogen as N (by SFS 5505: 1988) | mg/l | 99 | 290 |
| Other nitrogenous compounds excluding urea and biuret, such as ammonium and sodium carbamates (calculated based on urea, biuret, ammonium nitrogen and total nitrogen test results) | mg/l | <20 | 208 |
| Sodium (by SFS-EN ISO 11885: 2009) | mg/l | 17 | 1400 |
| Colour (absorbance by spectrophotometry at 430 nm) | | <0.05 | >1.5 |
| Chlorides, as $Cl^-$ (SFS-EN ISO 10304-1: 2009) | mg/l | 8.3 | 1250 |
| Sulphates, as $SO_4^{2-}$ (SFS-EN ISO 10304-1: 2009) | mg/l | 1.0 | 580 |
| Carbonates, as $CO_3^{2-}$ (SFS-EN 1484: 1997) | mg/l | 10.0 | 1930 |

The permeate obtained from membrane filtration step was subsequently concentrated from total dissolved solids content of 0.5% by weight to 60% by weight by evaporation.

The evaporated concentrate was subsequently subjected to biuret crystallization treatment by cooling the hot concentrate to about 25 degrees Celsius while continuously stirring. The obtained precipitate was filtered out from the mother liquor. The unwashed precipitate contained 77% by weight of biuret (analytical method: biuret forms complex with potassium sodium tartrate and $Cu^{2+}$ ions, which is quantitatively measured by spectrophotometer at 546 nm according to method published in the Regulation (EC) No 2003/2003 or alternatively by HPLC method). 8% of the total amount of biuret was found in the mother liquor and the rest 92% was found in the biuret-rich precipitate. The urea:biuret ratio in the mother liquor was 30:1.

Example 3: Carbamation Under Reduced Pressure

Cellulose pulp raw material was treated according to procedure described in example 1. The alkaline mixture of cellulose and urea was recovered from the mechanical mixing device in a pellet form.

The pellet batch was divided into 6 equal portions, of 500 g each. Each pellet portion was separately spread into a stainless steel cooking pan as thin layer of circa 1 cm. Each portion in the cooking pan was separately carbamated in a vacuum oven in the following conditions: 1) At 130 degrees Celsius and 250 mbar(a) for 180 min, 2) At 140 degrees Celsius and 250 mbar(a) for 180 min, 3) At 150 degrees Celsius and 250 mbar(a) for 180 min, 4) At 135 degrees Celsius and 500 mbar(a) for 180 min, 5) At 135 degrees Celsius and 150 mbar(a) for 180 min and 6) At 135 degrees Celsius and 50 mbar(a) for 180 min. Trials Nos. 1-4 were carried out under nitrogen flushing and trials Nos. 5-6 without nitrogen flushing.

The obtained cellulose carbamate pellets were recovered and ground. The powder form materials were washed free from water soluble nitrogenous compounds as follows: Circa 25 g amount of cellulose carbamate with the known moisture content was accurately weighed into 1000 ml volumetric flask, about 800 ml of boiling demineralized water was added and water soluble compounds were extracted from cellulose carbamate into water solution. The cellulose carbamate in water slurry was allowed to cool and tempered to 20 degrees Celsius. The volumetric flask was filled into the mark (1000 ml) with demineralized water. The cellulose carbamate slurry was allowed to settle in the volumetric flask. An aliquot portion of the solution was taken and filtered free from undissolved particles. The urea and biuret contents in filtrate were determined selectively by HPLC method and the total nitrogen content was determined by SFS 5505:1988. The total amount of water soluble compounds in the water solution was determined gravimetrically by evaporating the aliquot portion of the water solution. Based on the HPLC analyses, urea and nitrogen were stoichiometrically converted to nitrogen and the content of other nitrogenous compounds excluding urea and biuret was calculated by subtracting urea and biuret nitrogen from the total nitrogen content. These results were calculated as percentages of urea, biuret and other nitrogenous compounds in the water soluble fraction of the recovered cellulose carbamate.

| Carbamation under reduced pressure | | | |
|---|---|---|---|
| | Urea in water soluble fraction (%) | Biuret in water soluble fraction (%) | Other nitrogeneous compounds excluding urea and biuret in water soluble fraction (%) |
| 1) At 130 degrees Celsius and 250 mbar(a) for 180 min | 68 | 19 | 13 |
| 2) At 140 degrees Celsius and 250 mbar(a) for 180 min | 53 | 25 | 22 |
| 3) At 150 degrees Celsius and 250 mbar(a) for 180 min | 33 | 38 | 29 |
| 4) At 135 degrees Celsius and 500 mbar(a) for 180 min | 42 | 30 | 28 |
| 5) At 135 degrees Celsius and 150 mbar(a) for 180 min | 71 | 17 | 12 |
| 6) At 135 degrees Celsius and 50 mbar(a) for 180 min | 88 | 12 | <1 |

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in the production of cellulose carbamate, particularly in the production of cellulose carbamate that is suited to the preparation of a spin dope for spinning cellulose carbamate fibres for use in textiles, both woven and non-woven.

CITATION LIST

Patent Literature
 Finnish Patents No. 112869
 Finnish Patent No. 112795
 Finnish Patent No. 128164

The invention claimed is:

1. A method of producing cellulose carbamate in an aqueous phase comprising the steps of:
 a) providing a cellulose raw-material;
 b) providing urea;
 c) mixing cellulose and the urea to provide a mixture;
 d) subjecting the mixture to a reduced pressure of no more than 350 mbar(a);
 e) heating the mixture to a temperature of 130 to 150° C. to subject the cellulose to reaction with the urea to form cellulose carbamate, provided the reaction is carried out in the absence of liquid ammonia;
 f) releasing the pressure;
 g) recovering the cellulose carbamate, and
 h) washing the cellulose carbamate with water to remove water-soluble nitrogenous compounds, wherein the water-soluble nitrogenous compounds make up at the most 12% of the total weight of the cellulose carbamate and the water-soluble nitrogenous compounds.

2. The method according to claim 1, wherein the urea is an aqueous solution of urea.

3. The method according to claim 1, wherein the mixture is heated at 130 to 140° C. for 150 min.

4. The method according to claim 1, wherein the mixture is flushed with an inert gas during heating at reduced pressure to form the cellulose carbamate.

5. The method according to claim 1, wherein the pressure is released after completion of the reaction of the cellulose with the urea whereby the cellulose carbamate is formed.

6. The method according to claim 1, wherein water-soluble non-gaseous nitrogenous compounds and non-urea compounds are recovered separately from the cellulose carbamate and are recovered in the form of an aqueous solution.

7. The method according to claim 6, wherein non-urea compounds are separated from aqueous solution.

8. The method according to claim 6, wherein the recovered aqueous solution is concentrated by evaporation.

9. The method according to claim 6, wherein the separation of non-urea compounds is performed by selecting a separation method selected from the group consisting of ion exchange, membrane filtration, electrodialysis, and crystallization.

10. The method according to claim 1, wherein the urea is recovered and recycled to the urea providing step (b) where it is combined with a fresh feed of urea.

11. The method according to claim 1, comprising separately, and continuously, withdrawing any ammonia released during the reaction between the cellulose and the urea.

12. The method according to claim 11, wherein the ammonia is recovered and optionally reacted with acid to form an ammonium salt of the corresponding acid.

13. The method according to claim 1, wherein the mixture is subjected to a pressure of no more than 300 mbar(a).

14. The method according to claim 1, wherein the pressure is released at step (f) to become ambient.

15. The method according to claim 1, wherein the cellulose and the urea are subjected to mechanical working while forming the mixture.

16. The method according to claim 15, wherein the mechanical working comprises the step of shear mixing in a mechanical mixing device.

17. The method according to claim 1, wherein the mixture comprises an initial solid content of at least 25 wt % by weight of the composition.

18. The method according to claim 1, wherein the mixture obtained at step (c) is subjected to reduced pressure at step (d) without an intermediate step of removing water from the mixture.

19. The method according to claim 1, wherein the mixture is mixed continuously during steps (d) and (e) until the carbamation reaction is completed.

20. The method according to claim 1, wherein the water-soluble nitrogenous compounds make up 6% or less of the total weight of the cellulose carbamate and the water-soluble nitrogenous compounds.

* * * * *